Dec. 29, 1942.   F. E. MENNEN   2,306,459
FIFTH WHEEL
Filed April 14, 1942   3 Sheets-Sheet 1
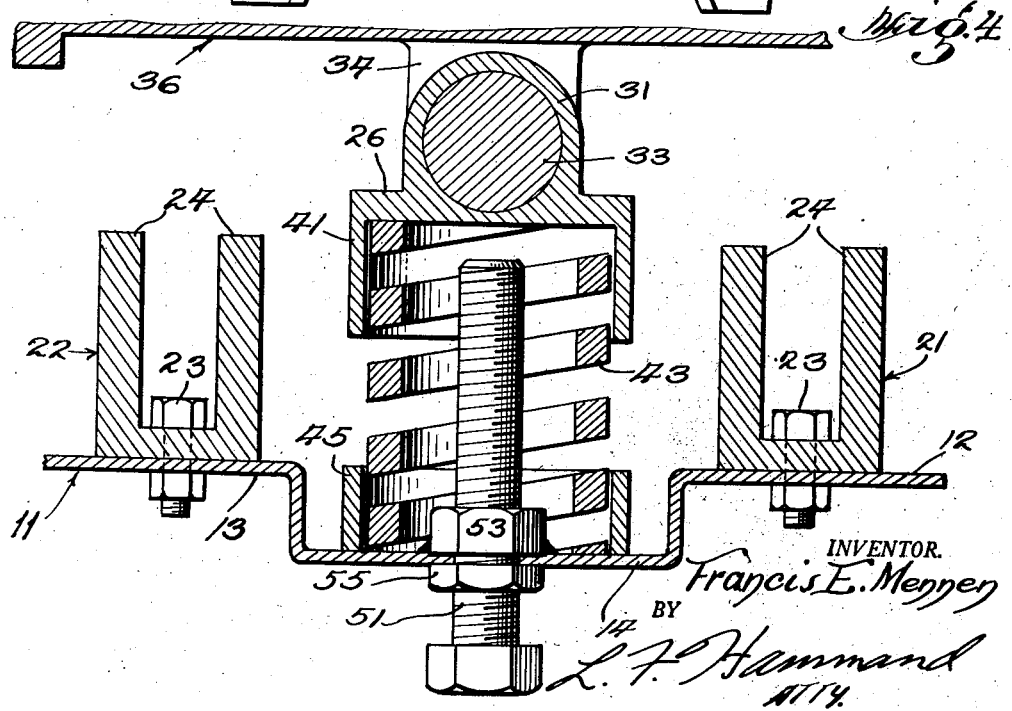
INVENTOR.
Francis E. Mennen
BY
L. F. Hammand
ATTY.

Dec. 29, 1942.   F. E. MENNEN   2,306,459
FIFTH WHEEL
Filed April 14, 1942   3 Sheets-Sheet 2
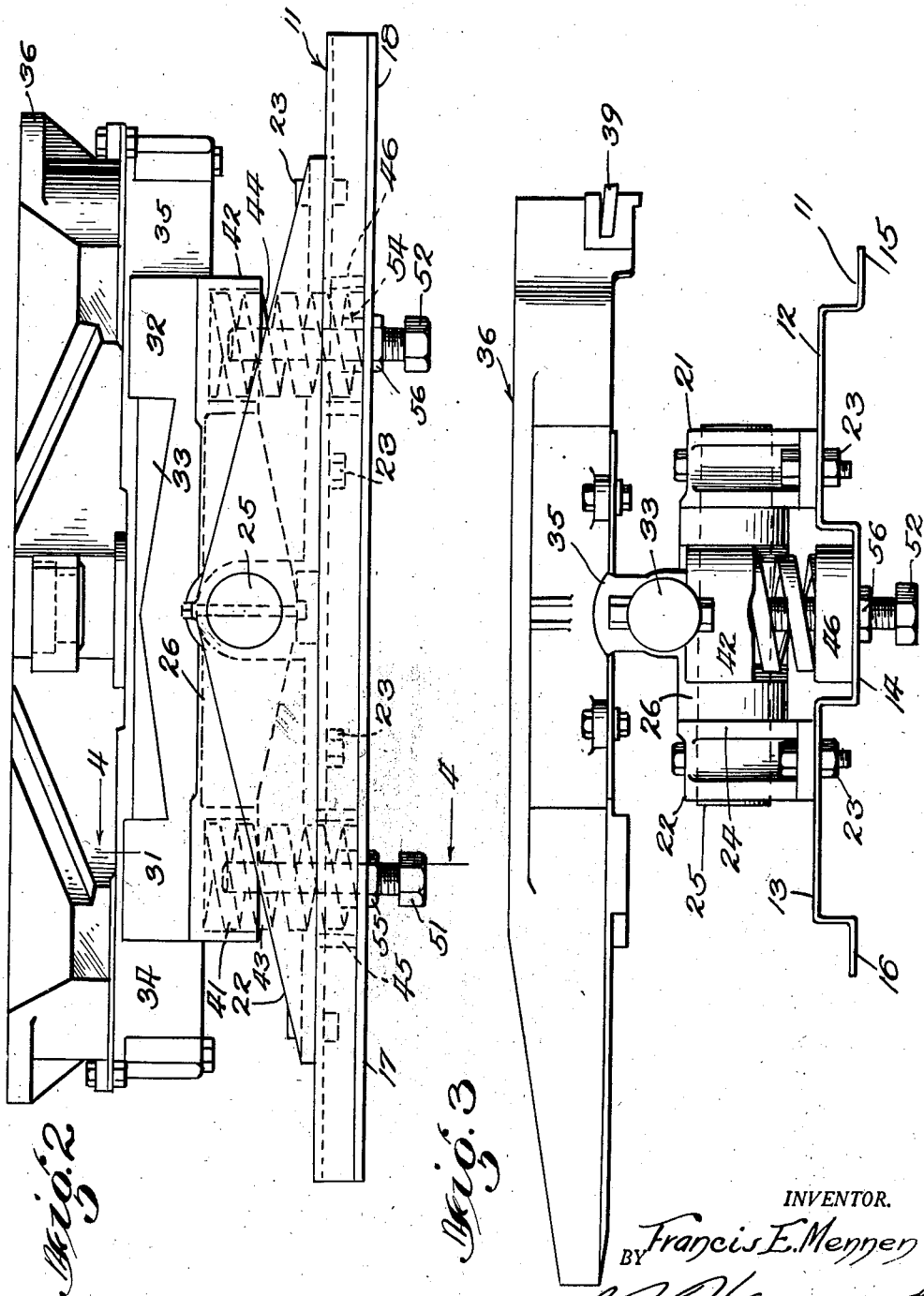
INVENTOR.
Francis E. Mennen
BY
L. F. Hammand
ATTY.

Dec. 29, 1942.  F. E. MENNEN  2,306,459
FIFTH WHEEL
Filed April 14, 1942  3 Sheets-Sheet 3
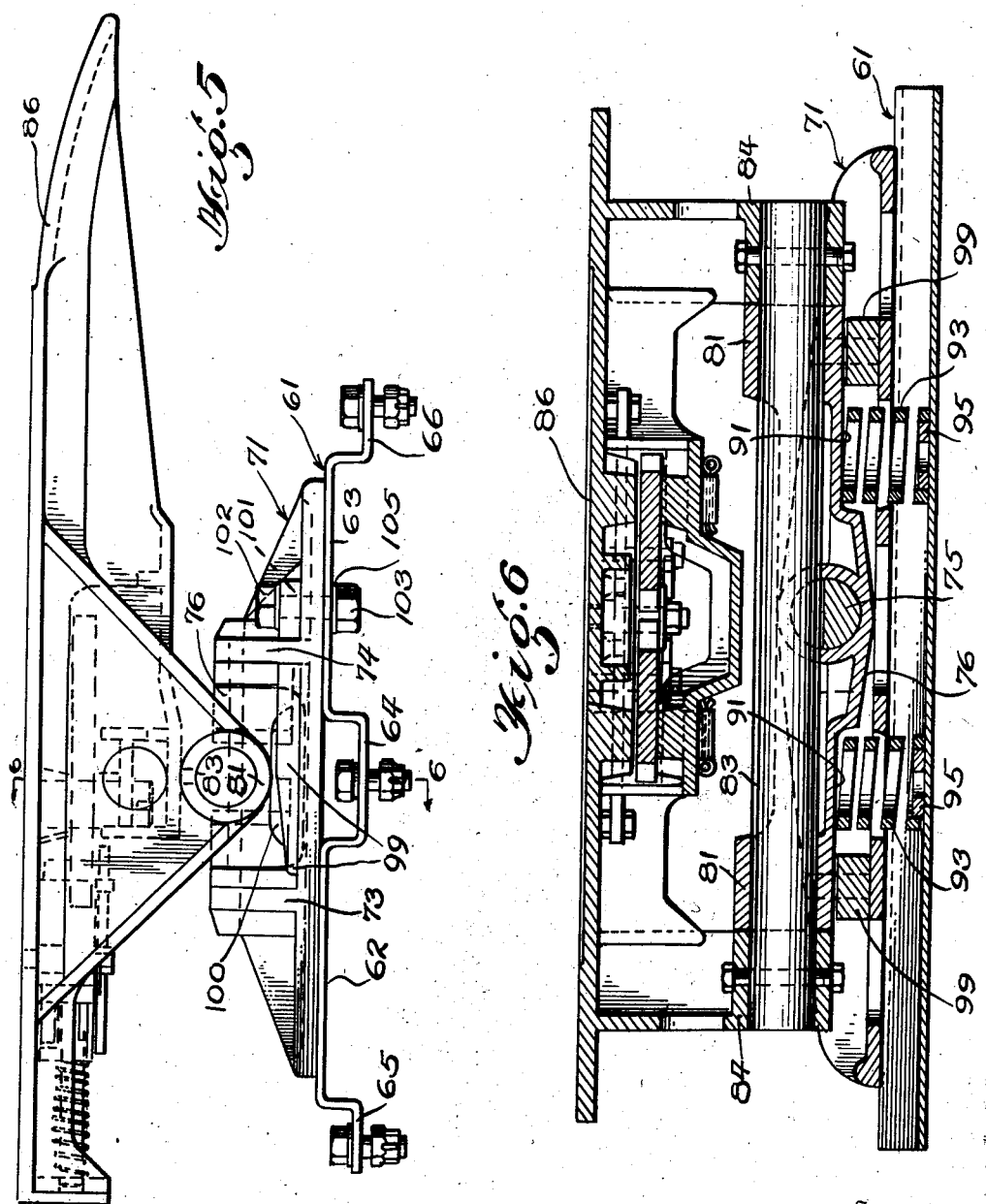
Inventor
Francis E. Mennen
By L. F. Hammand
Attorney Patented Dec. 29, 1942

2,306,459

UNITED STATES PATENT OFFICE 2,306,459

FIFTH WHEEL

Francis E. Mennen, Washington, D. C.

Application April 14, 1942, Serial No. 438,916

7 Claims. (Cl. 280—33.1)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to a fifth wheel assembly for tractor-trailer vehicles and is specifically directed to a novel type of fifth wheel support arranged to permit universal movement between the structures of the tractor and trailer in combination with means to control the side-to-side movement of the trailer.

As disclosed in the present application, the structural devices of the invention are arranged to be mounted on the frame of an automotive tractor and arranged to receive and support the front end of a trailer in a manner well understood in the art. Inasmuch as the tractor and trailer do not form a pertinent part of the present invention except as in combination with the fifth wheel assembly hereinafter disclosed, and since the tractor and trailer may be of any conventional form, they are not illustrated in the attached drawings.

It has been recognized in the prior art that certain important advantages may be obtained by providing a universal type of mounting for the fifth wheel assembly so that the trailer and tractor were free to move in any plane with respect to each other. It has been discovered, however, that in some applications this complete freedom of movement between the tractor and trailer is somewhat disadvantageous in that it permits excessive rocking of the trailer. It is appreciated, of course, that in certain types of applications the free rocking movement of the trailer is not objectionable, but in the development of trailers arranged to be used for the transportation of horses in the United States Army, it has been noted that the unlimited rocking of the trailer is highly undesirable since it makes it difficult or impossible for the animals to maintain satisfactory footing within the vehicle, and when driving over rough terrain, may result in serious injury to the horses.

It is therefore the principal object of this invention to provide a fifth wheel assembly for trailers including longitudinal and transverse trunnions arranged to permit universal movement between the tractor and trailer in combination with adjustable elements arranged to limit the side travel of the trailer with respect to the tractor.

A further object of the invention is to provide a universal type fifth wheel supporting assembly in combination with resilient stabilizing springs arranged to resist and exert a stabilizing action on the relative movement of the vehicle elements without positively limiting their movement with respect to each other.

Further objects of the invention will appear from the following description, taken in connection with the drawings accompanying and forming a part of the present specification, wherein:

Fig. 1 is a plan view of a fifth wheel assembly constructed in accordance with the teachings of this invention;

Fig. 2 is a rear elevational view thereof;

Fig. 3 is a side elevational view thereof;

Fig. 4 is an enlarged detail sectional view taken substantially on the plane of the line 4—4 of Fig. 2;

Fig. 5 is a side elevational view of a modified form of the invention, and

Fig. 6 is a detail sectional view taken substantially on the plane of the line 6—6 of Fig. 5.

In the preferred embodiment of the invention shown in the drawings, the base or bed plate 11 is formed of a single integral piece of steel plate folded to provide two transverse channel portions 12 and 13, spaced apart from each other by a central portion 14 of the plate. The plate is also formed to extend downwardly and outwardly at its forward and rear edge to provide edge flanges 15 and 16, lying in a plane somewhat below the upper surfaces of the transverse channel formations 12 and 13 and in the same plane as the central portion 14. The bed plate is intended to extend transversely across the frame members of any conventional type of automotive tractor, and it is contemplated that the center portion 14 and side flanges 15 and 16 are to be securely bolted to the frames of the tractor.

Inasmuch as the structural details of various tractors vary widely in detail, and since the present invention is adaptable to any conventional type, the frame members of the tractor have not been illustrated, but it may be pointed out that they will contact the lower surfaces of the bed plate at some point adjacent each end of the plate, as, for example, the points generically indicated at 17 and 18.

The transverse channel formations of the bed plate serve to give great rigidity to the structure and also provide mounting surfaces for a pair of transverse beams 21 and 22 arranged to extend from side to side of the bed plate and secured to the surfaces 12 and 13 respectively by a plurality of bolts 23. The transverse beams 21 and 22 are preferably formed as integral castings including reinforcing webs 24 and each of the beams includes a central opening adapted to receive a longitudinal trunnion shaft 25. It will be seen from an examination of the drawings than the trunnion shaft 25 has its forward and rearward ends mounted in the beams 21 and 22 respectively and bridges the distance between the beams to provide a pivotal support for an intermediate frame element 26.

The intermediate frame 26 is pivotally mounted with respect to the longitudinal trunnion shaft 25 and is preferably formed as a single casting including a pair of bearing portions 31 and 32. A transverse trunnion shaft 33 is mounted in the bearings 31 and 32 and extends outwardly beyond the bearings 31 and 32 where it is secured in the lugs 34 and 35 respectively. The lugs 34 and 35 are secured to and form an integral part of the upper bearing plate 36, which is adapted to receive and support the forward end of the trailer structure. The bearing plate constitutes the actual fifth wheel of the device, and it is provided with a conventional type throat 37, pivot socket 38 and locking mechanism 39. However, since these devices are entirely conventional, no detailed description is believed necessary in the present application.

As thus far described, the structure provides a universal connection between the trailer and tractor, arranged so that as the vehicles move over uneven surfaces, the longitudinal trunnion shaft will permit side travel and the transverse trunnion shaft will permit relative movement in the longitudinal plane so that the cooperation between the longitudinal and transverse shafts is effective to allow universal movement in any direction.

It has been previously pointed out, however, that while a certain amount of universal movement is desirable in structures of this type, yet unlimited freedom of movement results in some disadvantages, and the present invention is concerned with the provision of novel and improved means to limit or control the side travel between the tractor and the trailer and thus to stabilize the movement of the trailer and prevent uncontrolled swinging from side to side. To this end, the intermediate frame 26 is provided with a pair of inverted cylindrical spring sockets 41 and 42 each arranged to receive the upper end of the coil springs 43 and 44 respectively. The coil springs 43 and 44 are of comparatively heavy construction so that they will exert a relatively large degree of resistance to lateral swinging of the trailer and will thus stabilize the trailer body and tend to maintain it in a level, horizontal position. Each of the springs 43 and 44 extends downwardly from the upper socket to bear against the upper surface of the center portion 14 of the bed plate 11 and a pair of lower sockets 45 and 46 are provided to prevent shifting of the lower ends of the springs. It will be understood, of course, that springs of different size and stiffness may be used to provide a greater or less stabilizing effect as required and that if desired the springs may be preloaded to increase the tendency of the trailer to assume a horizontal position.

In addition to the resilient stabilizing springs the present invention contemplates the use of positive limiting devices to establish predetermined and fixed limits of side travel in either direction from the horizontal. This is accomplished by the provision of a pair of vertical machine screws 51 and 52 each provided with a hexagonal head at its lower end and each being threaded at one of the nuts 53 and 54 located on the upper surface of the central portion 14 of the bed plate 11. The nuts 53 and 54 are welded to the surface of the bed plate so that either of the adjusting screws 51 and 52 may be independently threaded upwardly or downwardly to reach the preferred position of adjustment. Locking nuts 55 and 56 are provided to maintain the adjusting screws 51 and 52 in predetermined position.

In operation the pivotal connection between the upper bearing plate 36 and the intermediate frame 26 is established by the transverse trunnion shaft 33 so that complete freedom of movement between the tractor and trailer are provided in a longitudinal plane. The longitudinal trunnion shaft 25 provides for a pivotal connection between the intermediate frame 26 and the beams 21 and 22 to afford some freedom of movement in a lateral direction, but this movement is controlled to a certain extent and limited by the stabilizing springs 43 and 44 and by the limiting screws 51 and 52. Each of the adjusting screws 51 and 52 extends downwardly below the lower surface of the bed plate 11 and the screws 51 and 52 and their cooperating lock nuts 55 and 56 are positioned between the points 17 and 18 so that the screw heads are between the locations of the frame members of the tractor vehicle and may be easily reached for adjustment. Further, it is to be noted that the limiting screws 51 and 52 may be independently adjusted so as to permit greater angular movement in one direction than the other or in order to compensate for the inclination of the vehicle due to operation on steeply crowned roads or on other uneven surfaces.

In practice, it is considered preferable to adjust the screws 51 and 52 to a position in which they are spaced somewhat below the central surface of the upper spring sockets so that a limited amount of side travel is possible without interference from the limiting screws but so that excessive side travel is prevented. In this connection, it should be noted, however, that the stabilizing springs 43 and 44 perform an important function since they tend to resist side travel and thus maintain the trailer in a steady horizontal position to provide the maximum safety and comfort for persons or animals being transported in the trailer body.

In the modified embodiment of the invention shown in Figures 5 and 6 of the drawings, the base or bed plate 61 is formed of a single integral piece of steel plate folded to provide two transverse channel portions 62 and 63, spaced apart from each other by a central portion 64 of the plate, in much the same manner as in the form previously described. The plate is also formed to extend downwardly and outwardly at its forward and rear edge to provide edge flanges 65 and 66, lying in a plane somewhat below the upper surfaces of the transverse channel formations 62 and 63 and in the same plane as the central portion 64. The portion 64 and the flanges 65 and 66 are bolted to the frame of the tractor vehicle.

The transverse channel formations of the bed plate provide mounting surfaces for a base casting 71 arranged to extend from side to side of the bed plate and secured to the surfaces 62 and 63 respectively by a plurality of bolts (not shown). The base casting 71 is preferably formed to include reinforcing webs 73 and 74 and includes a central opening adapted to receive a longitudinal trunnion shaft 75. It will be seen from an examination of the drawings that the trunnion shaft 75 has its forward and rearward ends mounted in the base 71 and that it bridges the distance between the webs 73 and 74 to provide a pivotal support for an intermediate frame element 76.

The intermediate frame 76 is pivotally mounted with respect to the longitudinal trunnion shaft 75 and is preferably formed as a single casting including a pair of bearing portions 81. A transverse trunnion shaft 83 is mounted in the bearings 81 and extends outwardly beyond the bearings, where it is secured in the lugs 84, forming an integral part of the upper bearing plate 86, which is adapted to receive and support the forward end of the trailer structure. The bearing plate constitutes the actual fifth wheel of the device, and it is provided with a conventional type throat and locking mechanism. However, since these devices are entirely conventional, no detailed description is believed necessary in the present application.

The structure thust far described provides a universal connection between the trailer and tractor, so that as the vehicles move over uneven surfaces, the longitudinal trunnion shaft will permit side travel and the transverse trunnion shaft will permit relative movement in the longitudinal plane.

To limit or control the side travel between the tractor and the trailer and thus to stabilize the movement of the trailer and prevent uncontrolled swinging from side to side, the intermediate frame 76 is provided with a pair of spring seats 91 on opposite sides of the structure. Each of them is arranged to receive the upper end of one of the coil springs 93. The coil springs 93 are of comparatively heavy construction so that they will exert a relatively large degree of resistance to lateral swinging of the trailer and will thus stabilize the trailer body and tend to maintain it in a level, horizontal position. Each of the springs 93 extends downwardly to bear against the upper surface of bed plate 71 and a pair of washers 95 are arc-welded to the plate to prevent shifting of the lower ends of the springs. It will be understood, of course, that in this modification, as well as in the form previously described, springs of different size and stiffness may be used to provide a greater or less stabilizing effect as required and that if desired the springs may be pre-loaded to increase the tendency of the trailer to assume a horizontal position.

This modification of the present invention contemplates the use of positive limiting devices comprising adjustable tapered wedges, rather than screws, to establish fixed limits of side travel. This is accomplished by the provision of a pair of tapered wedges 99 secured to the base casting by vertical machine screws 101 each provided with a hexagonal head 102 at its upper end and each extending through the base and bed plate 62 and secured in position by one of the nuts 103 located on the under surface of the bed plate. Locking washers 105 are provided to maintain the nuts 103 in position.

In operation the pivotal connection between the upper bearing plate 86 and the intermediate frame 76 is established by the tranverse trunnion shaft 73 as described hereinbefore, so that complete freedom of movement between the tractor and trailer are provided in a longitudinal plane. The longitudinal trunnion shaft 75 provides for a pivotal connection between the intermediate frame 76 and the base casting 71, to afford some freedom of movement in a lateral direction, but this movement is positively limited by the tapered wedges 99 which may be adjusted to provide a greater or less degree of movement, as desired. The wedges 99 are positioned so that their tapered end surfaces 100 lie immediately below the bearings 81 so that the wedge surfaces 100 will contact the lower surfaces of the bearings 81 and limit the angular movement of the fifth wheel.

Having thus described my invention, what I claim as new and desire to secure by Letters Patent, is:

1. In a fifth wheel assembly adapted to operatively interconnect an automotive trailer with a tractor vehicle, the combination of a pair of transverse beams; a pair of longitudinal openings in said transverse beams, said openings being arranged in axial alignment with each other and being adapted to receive and support a trunnion shaft; a trunnion shaft supported thereby; an intermediate frame member carried by said trunnion shaft, the arrangement being such as to permit pivotal movement between the intermediate frame and the transverse beams; a second trunnion shaft supported by the intermediate frame; and a bearing plate supported by said transverse trunnion shaft; the construction and arrangement being such as to permit angular movement between the intermediate frame and the bearing plate; a pair of spring sockets positioned adjacent the opposite sides of the intermediate frame; a coiled combination spring on each side of the intermediate frame to stabilize the movement of the trailer, and a pair of independent cooperating adjustable limiting devices each associated with one end of said intermediate frame and each comprising a threaded machine screw adapted to contact the intermediate frame to limit the movement thereof.

2. In a fifth wheel assembly adapted to operatively interconnect an automotive trailer with a tractor vehicle, the combination of a bed plate, a pair of transverse beams arranged to extend substantially across the width of the bed plate, a trunnion shaft carried by said beams, an intermediate frame member carried by said trunnion shaft, the arrangement being such as to permit lateral pivotal movement between the intermediate frame and the transverse beams, a second trunnion shaft arranged to be supported by the intermediate frame, a bearing plate supported by said second trunnion shaft, a pair of spring sockets positioned adjacent the opposite sides of the intermediate frame, a coiled combination spring on each side of the intermediate frame, said springs extending between the intermediate frame sockets and the bed plate, and a pair of independent cooperating adjustable limiting devices each associated with one end of said intermediate frame and each comprising a threaded machine screw adapted to extend upwardly to contact the intermediate frame to limit the movement thereof, the construction and arrangement being such that the adjusting head portions of the limiting screws extend downwardly below the lower surface of the bed plate and between the frame members of the tractor vehicle so that they may be independently adjusted.

3. In a fifth wheel assembly adapted to operatively interconnect an automotive trailer with a tractor vehicle, the combination of a bed plate comprising a single integral metal plate folded to provide a pair of transverse channel formations spaced apart from each other and having flange surfaces extending transversely of the plate and adapted to be bolted to the frame members of the tractor vehicle; a pair of transverse beams, one of said beams being secured to each of the transverse channel formations, and the beams being arranged to extend substantially across the width of the bed plate; a pair of longitudinal openings in said transverse beams, said openings being arranged in axial alignment with each other and being adapted to receive and support a longitudinal trunnion shaft; a longitudinal trunnion shaft supported thereby; an intermediate frame member carried by said trunnion shaft, the arrangement being such as to permit lateral pivotal movement between the intermediate frame and the transverse beams; a transverse trunnion shaft arranged to penetrate and be supported by the intermediate frame and a bearing plate supported by said transverse trunnion shaft, the construction and arrangement being such as to permit free angular movement between the intermediate frame and the bearing plate; and a pair of independent cooperating adjustable limiting devices each associated with one end of said intermediate frame and each comprising a threaded machine screw adapted to contact portions of the intermediate frame to limit the movement thereof, the construction and arrangement being such that the adjusting head portions of the limiting screws extend downwardly below the lower surface of the bed plate and between the frame members of the tractor vehicle so that they may be independently adjusted.

4. In a fifth wheel assembly adapted to operatively interconnect an automotive trailer with a tractor vehicle, the combination of a bed plate comprising a single integral metal plate folded to provide a pair of transverse channel formations spaced apart from each other and having flange surfaces extending transversely of the plate and adapted to be bolted to the frame members of the tractor vehicle; a base including a pair of transverse beams, said beams being secured to the transverse channel formations, and the beams being arranged to extend substantially across the width of the bed plate; a pair of longitudinal openings in said transverse beams, said openings being arranged in axial alignment with each other and being adapted to receive and support a longitudinal trunnion shaft; a longitudinal trunnion shaft supported thereby; an intermediate frame member carried by said trunnion shaft, the arrangement being such as to permit lateral pivotal movement between the intermediate frame and the transverse beams; a transverse trunnion shaft arranged to penetrate and be supported by the intermediate frame and a bearing plate supported by said transverse trunnion shaft, the construction and arrangement being such as to permit free angular movement between the intermediate frame and the bearing plate; a pair of spring sockets positioned adjacent the opposite sides of the intermediate frame; a pair of spring sockets associated with the bed plate and in cooperating relationship with the aforementioned spring sockets of the intermediate frame, and a coiled compression spring on each side of the intermediate frame, said springs extending between the intermediate frame sockets and the bed plate sockets respectively; and a pair of independent cooperating adjustable limiting devices each associated with one end of said intermediate frame and each comprising a threaded machine screw adapted to extend upwardly through the bed plate and within the coiled combination spring, and having their upper ends adapted to contact portions of the intermediate frame to limit the movement thereof; the construction and arrangement being such that the adjusting head portions of the limiting screws extend downwardly below the lower surface of the bed plate and between the frame members of the tractor vehicle so that they may be independently adjusted.

5. In a fifth wheel assembly adapted to operatively interconnect an automotive trailer with a tractor vehicle, the combination of a base frame; a pair of longitudinal openings in said base frame, said openings being arranged in axial alignment with each other and being adapted to receive and support a trunnion shaft; a trunnion shaft supported thereby; an intermediate frame member carried by said trunnion shaft, the arrangement being such as to permit pivotal movement between the intermediate frame and the transverse beams; a second trunnion shaft supported by the intermediate frame; and a bearing plate supported by said transverse trunnion shaft; the construction and arrangement being such as to permit angular movement between the intermediate frame and the bearing plate; a pair of spring sockets positioned adjacent the opposite sides of the intermediate frame; a coiled combination spring on each side of the intermediate frame to stabilize the movement of the trailer, and a pair of independent cooperating adjustable limiting devices each associated with one end of said intermediate frame and each comprising a tapered wedge adapted to contact the intermediate frame to limit the movement thereof.

6. In a fifth wheel assembly adapted to operatively interconnect an automotive trailer with a tractor vehicle, the combination of a base, a trunnion shaft carried by said beams, an intermediate frame member carried by said trunnion shaft, the arrangement being such as to permit lateral pivotal movement between the intermediate frame and the transverse beams, a second trunnion shaft arranged to be supported by the intermediate frame, a bearing plate supported by said second trunnion shaft, a pair of spring sockets positioned adjacent the opposite sides of the intermediate frame, a coiled combination spring on each side of the intermediate frame, said springs extending between the intermediate frame sockets and the bed plate, and a pair of independent cooperating adjustable limiting devices each associated with one end of said intermediate frame and each comprising a tapered wedge adapted to contact the intermediate frame to limit the movement thereof, the construction and arrangement being such that the tapered wedges are adjustably secured in position by separate machine screws so that they may be independently adjusted.

7. In a fifth wheel assembly adapted to operatively interconnect an automotive trailer with a tractor vehicle, the combination of a bed plate comprising a single integral metal plate folded to provide a pair of transverse channel formations spaced apart from each other and having flange surfaces extending transversely of the plate and adapted to be bolted to the frame members of the tractor vehicle; a base secured to the transverse channel formations, said base including reinforcing portions arranged to extend substantially across the width of the bed plate; a pair of longitudinal openings in said base, said openings being arranged in axial alignment with each other and being adapted to receive and support a longitudinal trunnion shaft;

a longitudinal trunnion shaft supported thereby; an intermediate frame member carried by said trunnion shaft, the arrangement being such as to permit lateral pivotal movement between the intermediate frame and the transverse beams; a transverse trunnion shaft arranged to penetrate and be supported by the intermediate frame and a bearing plate supported by said transverse trunnion shaft, the construction and arrangement being such as to permit free angular movement between the intermediate frame and the bearing plate; and a pair of independent cooperating adjustable limiting devices each associated with one end of said intermediate frame and each comprising a shiftable stop element adapted to contact portions of the intermediate frame to limit the movement thereof, the construction and arrangement being such that the shiftable stop elements may be independently adjusted.

FRANCIS E. MENNEN.